United States Patent [19]

Peng

[11] Patent Number: 5,917,696
[45] Date of Patent: Jun. 29, 1999

[54] STRUCTURE FOR CONNECTING SEAT OF PC MAINBOARD AND INTERFACE CARDS AND FOR COMPUTER HOUSING

[75] Inventor: Chen-Hsing Peng, Taoyuan, Taiwan

[73] Assignee: Enlight Corporation, Taoyuan, Taiwan

[21] Appl. No.: 08/931,577

[22] Filed: Sep. 16, 1997

[51] Int. Cl.⁶ .................................................. G06F 1/16
[52] U.S. Cl. ............................................................ 361/686
[58] Field of Search ................................... 361/683, 684, 361/686, 724, 725, 752, 796, 802; 312/223.1, 223.2

[56] References Cited

U.S. PATENT DOCUMENTS

| | | | |
|---|---|---|---|
| 4,971,563 | 11/1990 | Wells, III | 361/683 |
| 5,067,041 | 11/1991 | Cooke et al. | 361/685 |
| 5,124,885 | 6/1992 | Liu | 361/724 |
| 5,145,243 | 9/1992 | Liu | 312/223 |
| 5,159,528 | 10/1992 | Murphy | 361/724 |
| 5,278,351 | 1/1994 | Herrick | 361/683 |
| 5,527,104 | 6/1996 | Moss | 312/223.2 |
| 5,593,219 | 1/1997 | Ho | 361/724 |
| 5,675,472 | 10/1997 | Hamerton-Kelly | 361/684 |

Primary Examiner—Leo P. Picard
Assistant Examiner—Lisa Lea-Edmonds
Attorney, Agent, or Firm—Merchant, Gould, Smith, Edell, Welter & Schmidt

[57] ABSTRACT

The present invention relates to an improved structure for the connecting seat of a PC mainboard and interface cards and for a computer housing, in particular to an improved connecting seat structure, for fastening a mainboard and interface cards, being detachable/attachable from/to a computer housing. The present invention comprises a connecting seat having a longer plank connected to a shorter plank, where the inner side of the longer plank is connected to the mainboard and the inner side of the shorter plank is connected to interface cards and their input/output ports. One end of the longer plank is provided with a lid and fastening tabs being adapted to fastening grooves formed on the corresponding locations of the computer housing, where an operative insert is provided to couple the connecting seat and the computer housing for convenient locking or unlocking operations. The end of the computer housing corresponding to the shorter plank is provided with a plurality of fasteners in which the end of the shorter plank is inserted and positioned. Such an improved detachable/attachable structure for connecting seat and the computer housing facilities convenient assembly in manufacturing, and easy disassembly in later maintenance.

2 Claims, 6 Drawing Sheets

STRUCTURE FOR CONNECTING SEAT OF PC MAINBOARD AND INTERFACE CARDS AND FOR COMPUTER HOUSING

BACKGROUND OF THE INVENTION

1. Field of the Invention

The present invention relates to an improved structure for the connecting seat of a PC mainboard and interface cards and for a computer housing, in particular to an improved connecting seat, for fastening a mainboard and interface cards, being detachable/attachable from/to a computer housing. The present invention comprises a connecting seat having a longer plank connected to a shorter plank, where the inner side of the longer plank is connected to the mainboard and the inner side of the shorter plank is connected to the interface cards and their input/output ports. One end of the longer plank is provided with a lid and fastening tabs being adapted to fastening grooves formed on the corresponding locations of the computer housing, where an operative insert is provided to couple the connecting seat and the computer housing for convenient locking and unlocking operations. The end of the computer housing corresponding to the shorter plank is provided with a plurality of fasteners in which the end of the shorter plank is inserted and positioned. The connecting seat and the computer housing being an improved detachable/attachable structure facilitates convenient assembly in manufacturing, and easy disassembly in later maintenance.

2. Description of the Prior Art

The computer industry is extremely competitive among the manufacture due to its expeditious progress. The market price of hardware and software reduces as the development and regeneration of hardware and software of higher levels continue. Therefore, not only must the computer manufacture react to the varying market prices of components, but they must also reduce the assembly cost so as to create profit margin and to be more competitive, which is a topic related to the efficiency of assembling a computer. FIG. 1 illustrates an exploded view of the housing of a vertical computer after removal of its lid, wherein the housing comprises a shell A in a "U" shape, a front panel A1 being a connecting panel adapted to Floppy Drive Diskettes (FDD) and Hard Drive Diskettes (HDD), a rear panel A2 adapted to an input/output port plate A3, through which the power supply, interfaces cards B and various inputs/outputs are provided, and a side panel A4 for connecting a mainboard C. Such a housing, due to the connection between the interface cards and the mainboard C and the configuration limitation of the housing A, is manufactured in an assembly line by a specific process, that is, by sequentially assembling each component in a single assembly line. Therefore, the manufacturing process is drawn out due to the numerous components required, like those required in a multi-media computer. It is thus hard to control the quality of the production because problems occur in one of the assembling links may halt the entire assembly line.

Furthermore, the compact, internal space of the computer and the packed arrangement of the components are inconvenient for the assembly in manufacturing and disassembly in later maintenance and ultimately result in inefficiency.

In view of the above disadvantages, the inventor of the present invention invents an improved structure for the connecting seat of a PC mainboard and interface cards and for computer housing through diligent trails and based on experiences accumulated from years of research in the improvements made in the computer housing.

SUMMARY OF THE INVENTION

The primary object of the present invention is to provide an improved, detachable structure for the connecting seat of a PC mainboard and interface cards and for computer housing, such that the computer housing may be manufactured in two assembly lines and be assembled into a finished product in a later process so as to increase manufacturing efficiency, to elevate productivity, and to have better control over quality thereby reducing the manufacturing cost.

Another object of the present invention is to provide an improved, conveniently detachable structure for the connecting seat of a PC mainboard and interface cards and for computer housing such that sufficient space is provided in the computer housing for convenient assembly in manufacturing and easy disassembly in later maintainer as well as in subsequent expansions.

In order to clearly delineate the objets, characteristics and advantages of the present invention, a few preferred embodiments are specifically explained in detail in accompany with the drawings as follows.

BRIEF DESCRIPTION OF THE INVENTION

DETAILED DESCRIPTION OF THE INVENTION

Figure 1:
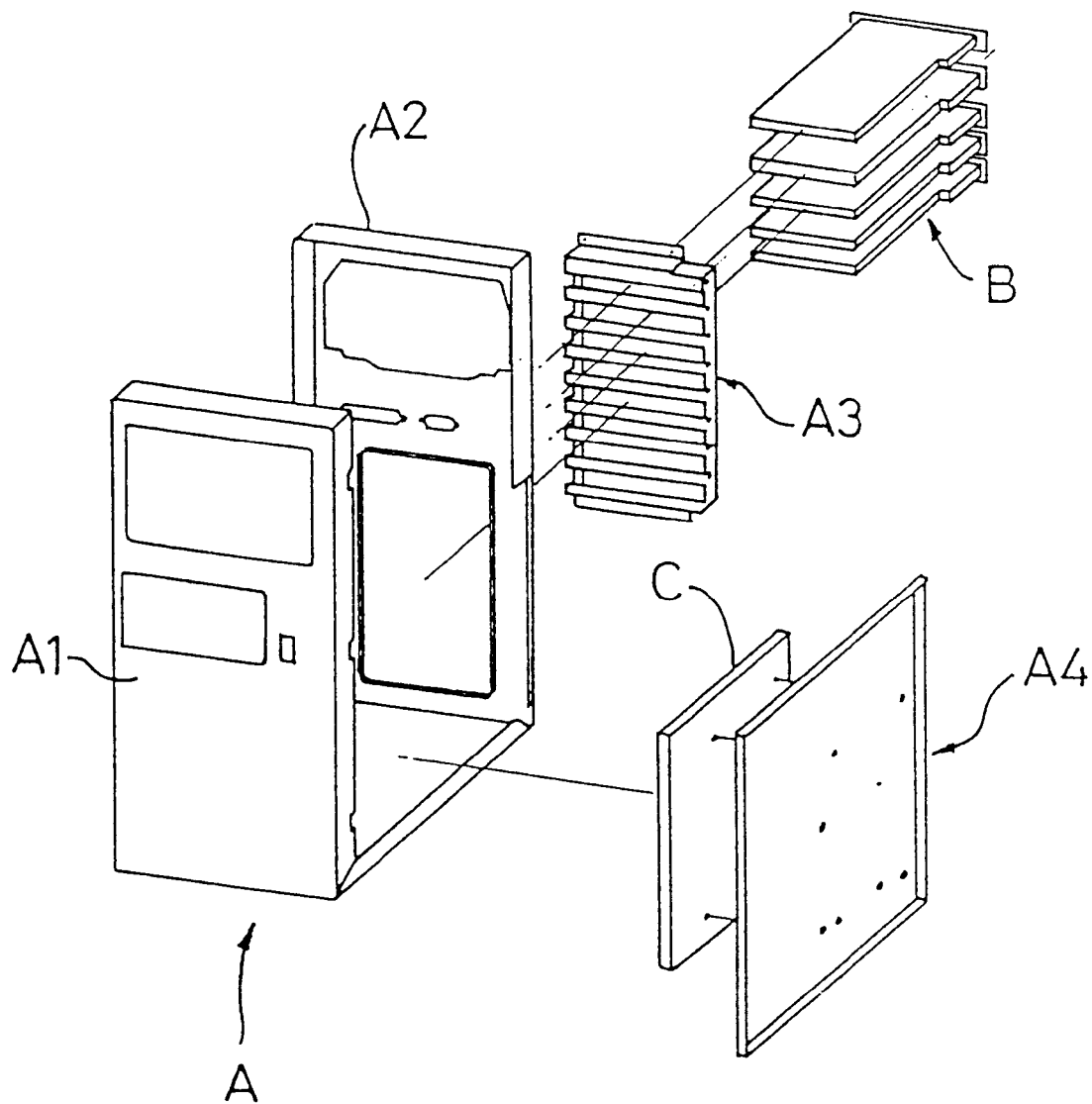
FIG. 1 illustrates an exploded view of the housing of a vertical computer after removal of its lid.
Figure 2:
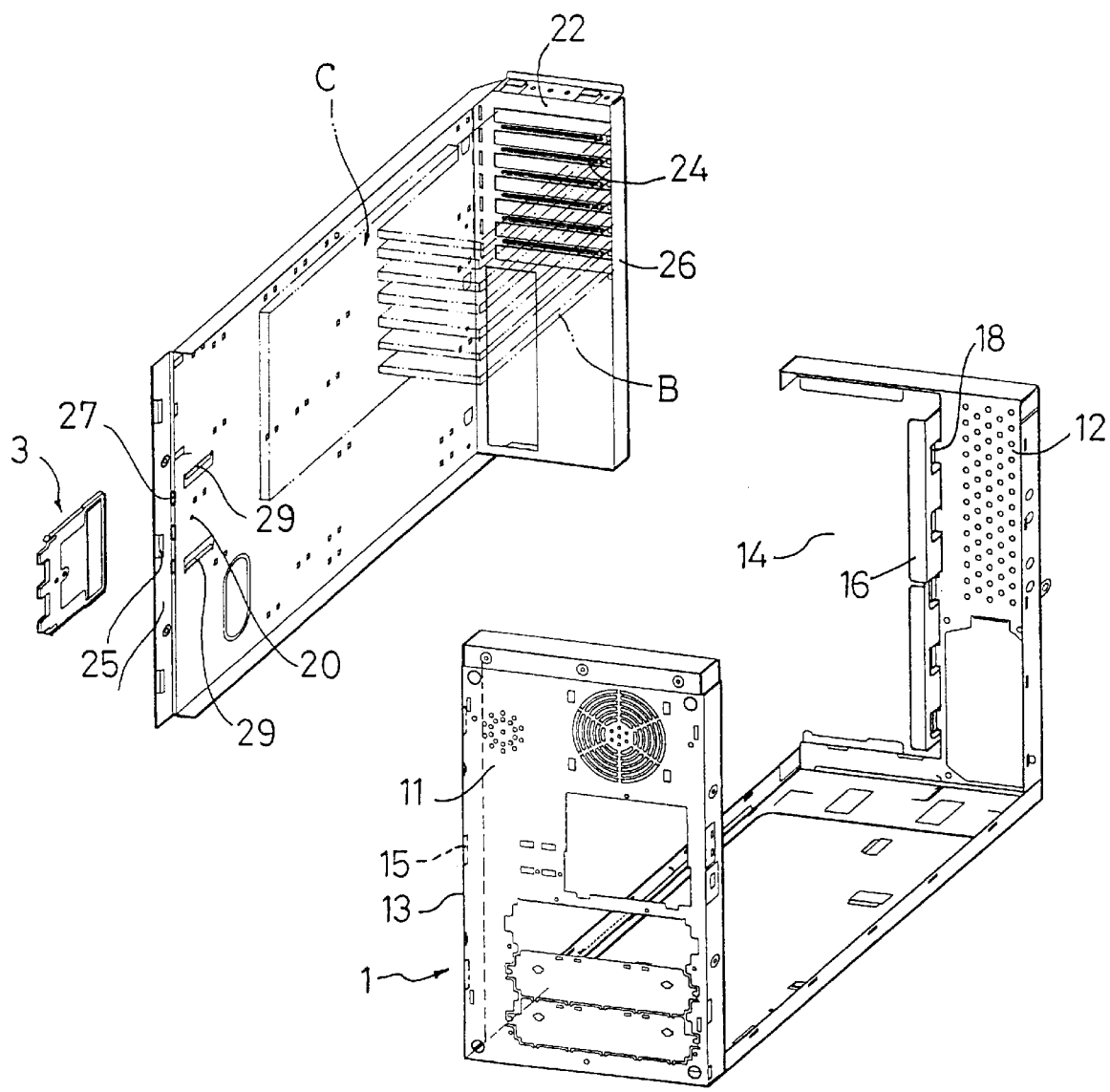
FIG. 2 illustrates an exploded, perspective view of the present invention.
Figure 4:
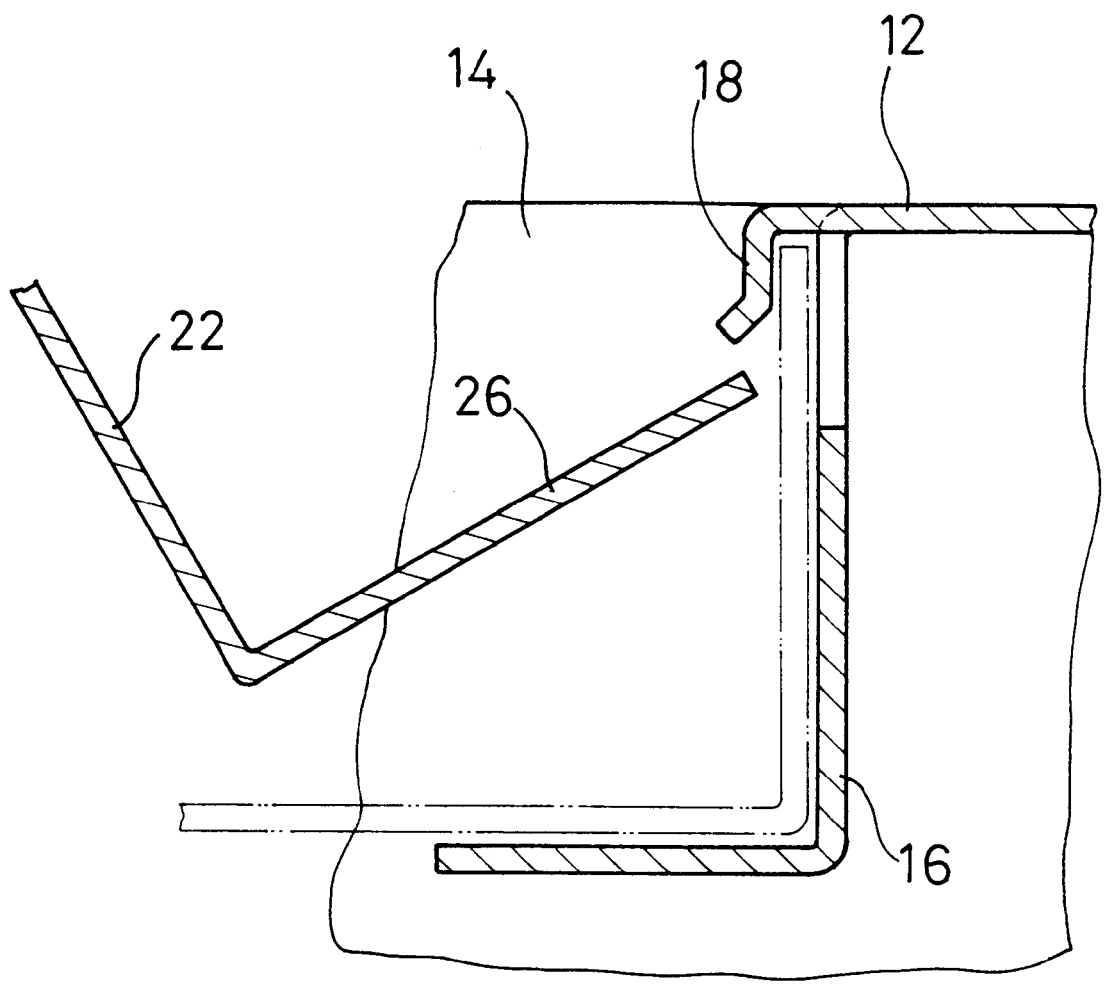
FIG. 4 is a top plan view illustrating the assembly operation of the front and rear end portions of the present invention.
Figure 5:
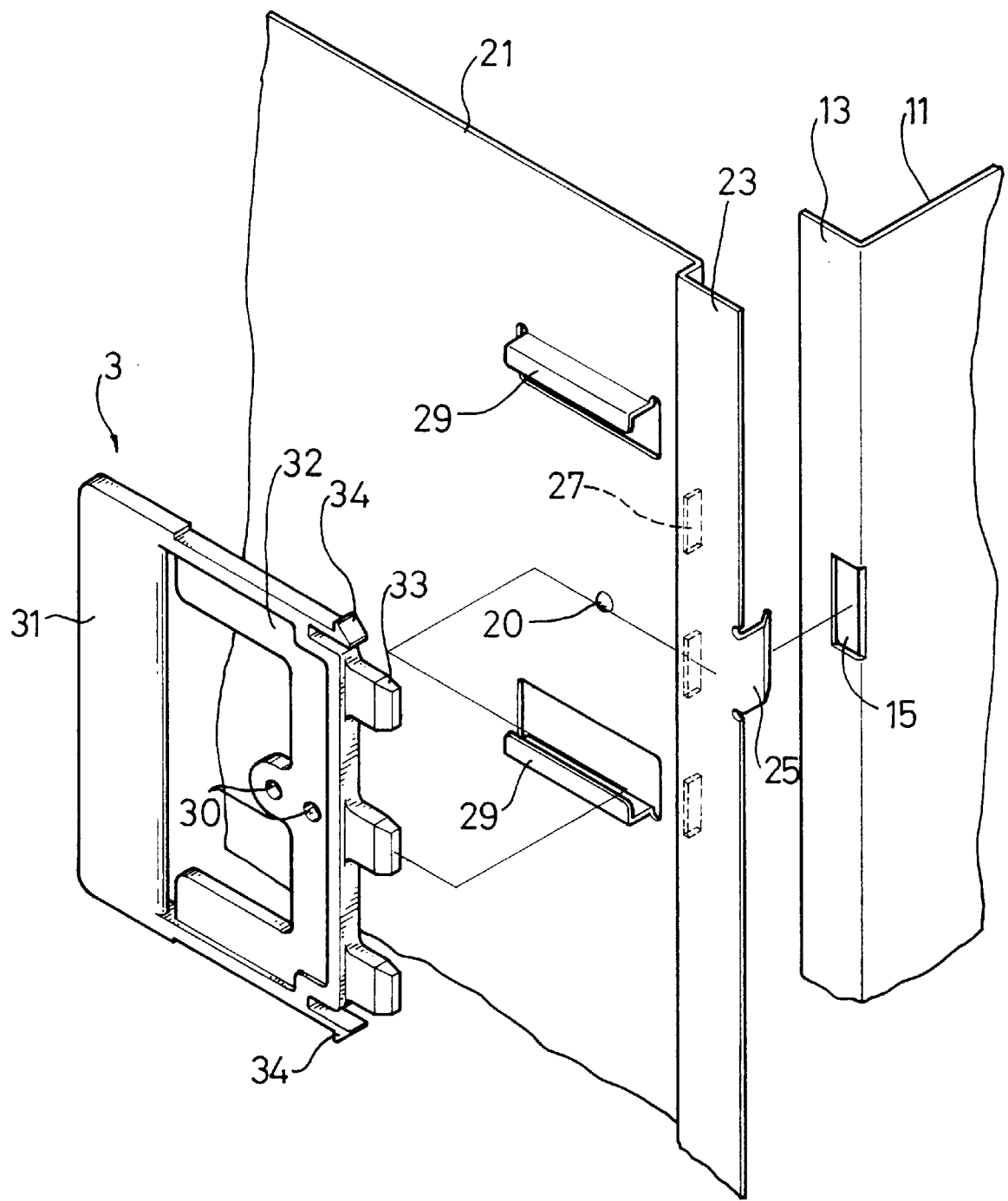
FIG. 5 is a partially exploded, perspective view of the present invention.

The present invention relates to an improved structure for connecting seat of a PC mainboard and interface cards and for computer housing, as illustrated in FIG. 2, in particular to an improved connecting seat 2 structure, for fastening a mainboard and interface cards, being detachable/attachable from/to a computer housing 1, wherein the housing 1 and the connecting 2 are designed to be detachable/attachable from/to each other. The front panel 11 of the housing 1 is provided to receive HDD, FDD, and switches, wherein the front panel 11 has a side being formed as a folding edge 13. At the turning portion of the folding edge and the front panel is formed with a plurality of fastening grooves 15 (FIG. 5). The rear panel 12 has a section being formed with a recessed portion 14, the recessed portion 14 having a side edge being formed with a bent plate 16, wherein the bent plate 16 is provided with a plurality of fasteners 18 at the bottom thereof (FIG. 4). The connecting seat 2 includes a longer plank 21 connected to a shorter plank 22, thereby forming an "L" shape, where the inner side of the longer plank 21 is connected to the mainboard C and the surface of the front end portion of the longer plank is provided with a bent lid 23 extending outwards. The lid has an outer edge being formed with fastening tabs 25 corresponding to the fastening grooves 15. The inner side of the shorter plank 22 is connected to interface cards B and their input/output ports. The shorter plank 22 has a surface being adapted to an input/output port plate 24 and an outer edge being formed with an insert plate 26 bending outwards.

Figure 3:
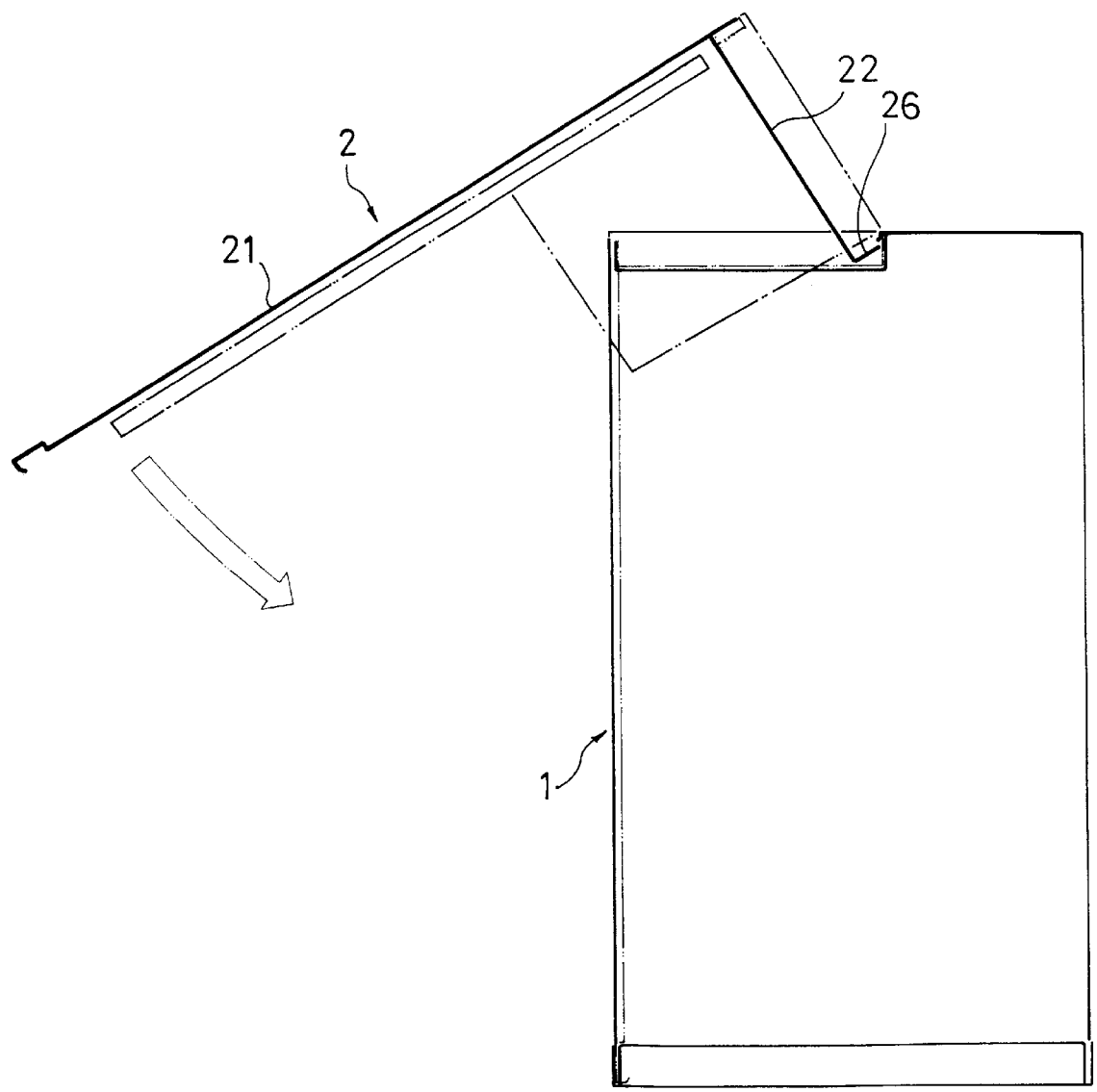
FIG. 3 is a top plan view illustrating the assembly operation of the present invention.

The attachment and detachment between the housing 1 and the connecting seat 2 are subjected to the aforementioned constructions as illustrated in FIGS. 3 and 4, such that the insert plate 26 of the shorter plank 22 of the connecting seat is first obliquely secured into the bent plate 16 formed on the outer edge of the rear panel 12 of the housing 1. The insert plate 26 is then seized by the fasteners 18. The longer plank 21 then approaches the side surface of the housing 11 by rotating about the insert plate 26 such that the lid 23 of the longer plank 21 covers the folding edge 13 of the housing and that the fastening tabs 25 insert into the fastening grooves 15 of the folding edge. The shorter plank 22 of the connecting seat 21, thus, covers the recessed portion 14 and jointly form a rear portion of the computer. The longer plank 21 covers the side surface of the housing 1 so as to facilitate the assembly of mainboard and interface cards. The longer plank is further connected to such components as the HDD and FDD within the housing to jointly form a computer structure.

Figure 6:
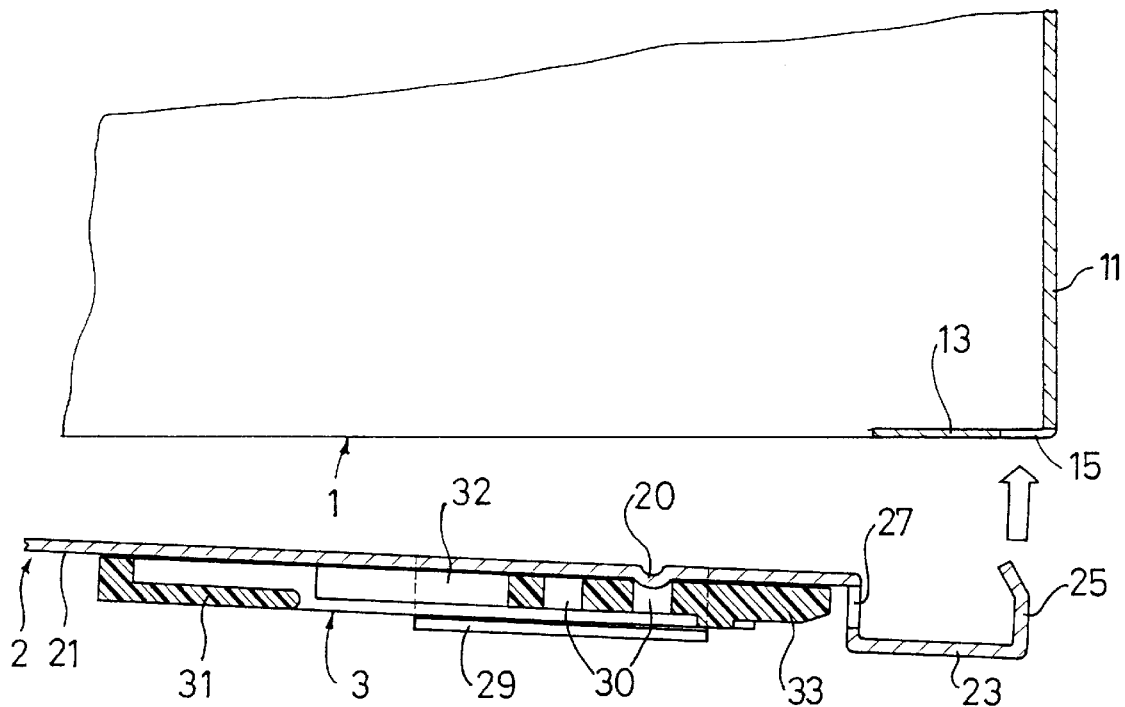
FIG. 6 is a partially top plan view A illustrating the assembly operation of the present invention.
Figure 7:
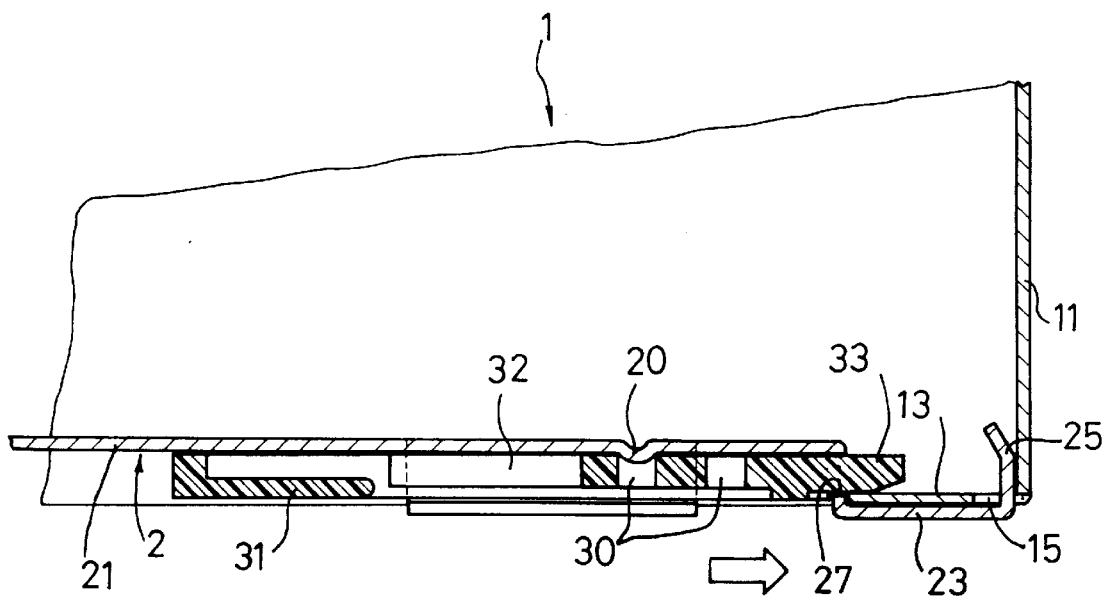
FIG. 7 is a partially top plan view B illustrating the assembly operation of the present invention.

In the present invention, the joint between the front panel 11 of the housing 1 and the longer plank 21 of the connecting seat is provided with an operative insert 3 to couple the connecting seat and the computer housing for convenient locking or unlocking operations. As illustrated in FIG. 5, the insert is in a thin, flat shape having a rear portion being formed with a push grip 31 and a front portion being formed with a plate body 32. The front end of the plate body 32 is provided with a plurality of tenons 33. The opposing sides of the plate body 32 are provided with resilient barbs 34. The plate body 32 is at the center thereof formed with two openings 30 locating on the same horizontal axis. The insert 3 is disposed on the outer side of the longer plank 21, which is formed with two horizontal, parallel rails 29 neighboring the lid 23 for the insert 3 to slide therebetween. The barbs 34 are each secured to one end of each rail to prevent the insert 3 from separation. The root portion of the lid 23 is formed with mortises 27 at locations corresponding to the tenons 33. On one face of the longer plank 21 is formed with a boss 20 at a location corresponding to the openings so as to operatively restrain the insert 3 in its designated location. With reference to FIGS. 6 and 7, after the longer plank 21 approaches the side of the housing 1 such that the lid 23 covers the folding edge 13 of the housing 1 and that the fastening tabs 25 are inserted into the fastening grooves 15 of the folding edge, the lid 23, the folding edge 13, and the fastening tabs 25 jointly form a construction by pushing the insert 3 and by matching the tenons to the mortises 27. To release the connecting seat, the insert 3 is ejected to disengage the locking position between the connecting seat 2 and the housing 1.

The primary function of the present invention is to provide an improved, detachable structure for the connecting seat of a PC mainboard and interface cards and for computer housing such that the computer housing may be manufactured in two assembly lines, one of which assembles HDD, FDD, the switches of the housing 1, and the other assembles the connecting seat 2, the mainboard, the interface cards, and their input/output ports. The housing and the connecting seat are then assembled into a finished product in a later process so as to increase manufacturing efficiency, to elevate productivity, and to have better control over quality thereby reducing the manufacturing cost. Furthermore, because the computer according to the present invention is detachable into two portions, it provides sufficient space in the computer housing for hand maneuvers, tools, and components so as to facilitate convenient assembly in manufacturing and easy disassembly in later maintenance as well as in subsequent expansions.

Aforementioned explanations are directed to the descriptions of a few preferred embodiments according to the present invention. Various changes and implementations based on the technical concepts and spatial arrangement of the present invention can be made by those skilled in the art without departing from the claims of the present invention.

What is claimed is:

1. An improved structure for the connecting seat of a PC mainboard and interface cards and for a computer housing, wherein said connecting seat for fastening said mainboard and said interface cards is detachable/attachable from/to said computer housing, comprising:

a U-shaped housing having a front panel, a base and a rear panel, said front panel for receiving HDD, FDD, and switches, said front panel having a side being formed as a folding edge, and said front panel being formed with a plurality of fastening grooves on said folding edge; and said rear panel having a section being formed with a recessed portion, said recessed portion having a side edge being formed with a bent plate, wherein said bent plate is provided with a plurality of fasteners at the bottom thereof; and a connecting seat having a right angle including a longer plank and a shorter plank, wherein said longer plank has an inner side being connected to said mainboard, the surface of the front end portion of said longer plank being provided with a bent lid extending outwards and having an outer edge being formed with fastening tabs corresponding to said fastening grooves; and said shorter plank has an inner side being connected to said interface cards and their input/output ports, said shorter plank having a surface being adapted to an input/output port plate and an outer edge being formed with an insert plate bending outwards;

whereby in assembly said insert plate of said shorter plank of said connecting seat is first obliquely secured into said bent plate formed on said outer edge of said rear panel of said housing; said insert plate is then seized by said fasteners; said longer plate then approaches a sides surface of said housing by rotating about said insert plate such that said lid of said longer plank covers said folding edge of said housing, that said fastening tabs insert into said fastening grooves of said folding edge, that said shorter plank of said connecting seat covers said recessed portion thereby jointly forming a rear portion of a computer, and that said longer plank covers said side surface of said housing so as to facilitate the assembly of said mainboard and interface cards and is connected to such components as the HDD and FDD within the housing thereby jointly forming a computer structure.

2. The improved structure for the connecting seat of a PC mainboard and interface cards and for a computer housing according to claim 1, wherein said front panel of said housing and said longer plank of said connecting seat form a joint, said joint being provided with an operative insert to couple said connecting seat and said computer housing for convenient locking or unlocking operations; wherein said insert is in a thin, flat shape having a rear portion being formed with a push grip and a front portion being formed with a plate body, the front end of said plate body being provided with a plurality of tenons, the opposing sides of said plate body being provided with resilient barbs, and said plate body being at the center thereof formed with two openings locating on the same horizontal axis; wherein said insert is disposed on the outer side of said longer plank; said longer plank is formed with two horizontal, parallel rails neighboring said lid for said insert to slide therebetween; said barbs are each secured to one end of each said rail to prevent said insert from separation; said lid has a root portion being formed with mortises at locations corresponding to said tenons; said longer plank is formed with a boss on one face thereof and at a location corresponding to said openings so as to operatively restrain said insert in its designated location; whereby said lid, said folding edge, and said fastening tabs jointly form a construction by pushing said insert and by matching said tenons to said mortises, and whereby the locking position between said connecting seat and said housing is disengaged by ejecting said insert so as to release said connecting seat.

* * * * *